United States Patent [19]

Aunsholt

[11] Patent Number: 4,589,887
[45] Date of Patent: May 20, 1986

[54] FUEL BRIQUETTES AND METHOD OF MAKING

[75] Inventor: Knud E. H. Aunsholt, Roskilde, Denmark

[73] Assignee: Kryolitselskabet Oresund A/S, Copenhagen, Denmark

[21] Appl. No.: 728,583

[22] Filed: Apr. 29, 1985

[30] Foreign Application Priority Data

May 4, 1984 [DK] Denmark ............... 2224/84

[51] Int. Cl.$^4$ ............................... C10L 5/12
[52] U.S. Cl. ........................ 44/16 R; 44/1 A
[58] Field of Search ............ 44/1 A, 15 R, 16 R

[56] References Cited

U.S. PATENT DOCUMENTS 1,659,337  2/1928  Tonkin ...................... 44/16 R
2,907,645  10/1959  Hartmann ................. 44/16 R
4,309,190  1/1982  Baron et al. .............. 44/16 R
4,426,282  1/1984  Aunsholt .................. 209/167

Primary Examiner—Carl F. Dees
Attorney, Agent, or Firm—Murray and Whisenhunt

[57] ABSTRACT

Fuel briquettes on the basis of solid organic combustible material, notably biomass material such as straw or other agricultural, horticultural and silvicultural waste or organic household waste, or fine particle industrial waste obtain a satisfactory storing and transporting quality when the binder therein is 3–50% by weight of fly ash coke. Fly ash coke is the carbon rich fraction separated from the mineral components of fly ash, preferably by flotation under specified conditions. The briquettes are otherwise prepared in briquette presses according to the teachings of the art. Preferably there is used a nozzle pressure for the extrusion of 70–100 kg/cm$^2$ and it is advantageous to preheat the raw materials to 50°–70° C. before conveying them to the briquette press.

9 Claims, No Drawings

0
FUEL BRIQUETTES AND METHOD OF MAKING

FIELD OF THE INVENTION

The present invention relates to fuel briquettes made on the basis of solid combustible organic material such as biomass material and/or combustible solid industrial waste and containing a solid, combustible binder originating from fly ash. The invention also relates to the preparation of these briquettes.

Biomass material in this specification including its claims means any combustible solid material of organic origin which has not been heavily converted by the influence of geological forces (which means that anthracite, pitcoal and lignite but not peat are excluded from the concept of biomass material). An important source of biomass material for the present purpose will be various kinds of waste materials, mainly of vegetable origin, such as straw, other agricultural waste, garden waste, comminuted wood refuse (small branches, twigs, roots), dead leaves or plants, waste from sawmills and wood processing plants, and the like; but also kitchen waste such as potato peels, vegetable waste, bean, pea and nut shells, sinewy meat bits, waste paper may be used, preferably after metal parts and coarser uncombustible particles have been separated off. Industrial combustible, solid waste in this specification including its claims especially is paper shavings, scraps of paper, board, textiles and plastics, dust, saw dust, cork waste, wood waste, slaughterhouse waste, waste from various food industries, etcetera; before using such waste for briquette making larger, re-usable pieces of paper and plastics usually are separated off.

Briquettes in the present specification mean shaped, pressed bodies for use as fuel, irrespective of their shape. For many burner types cylindrical pellets having a diameter of, for instance, 1 cm and lengths of a few cm will be suitable. They may be formed by extrusion. In many cases it may be expedient to prepare, likewise by extrusion, cylindrical briquettes having a larger diameter, e.g. 4–10 cm, and lengths of e.g. 20 cm. Other suitable briquettes may be box-shaped, for instance having a size approximately as bricks or less. Techniques for shaping and pressing fuel briquettes in briquette presses are well-known for those skilled in the art and do not need any particular description in this specification.

BACKGROUND OF THE INVENTION

It is known from Swedish patent specification No. 40869 to prepare fuel briquettes from comminuted wood refuse (small branches, twigs, roots etcetera) while admixing 5–15% charcoal as gas binding agent; the charcoal does not appear to act as a binder for the briquettes since it must be assumed that its gas binding effect is due to the known adsorptive effect of activated carbon.

From British patent specification No. 1,286,532 it is known to produce fuel briquettes from refuse or other waste material by removing metals and fines, crushing and drying the waste or refuse and mixing it with pulverized coal (pitcoal) or coke to enrich the calorific value, and then before briquetting at a temperature less than 225° C. to add a bonding agent. A simplification of this method is stated in Danish patent specification No. 143,859 to consist in mixing those parts of the refuse or waste that are to be briquetted with coal dust after which the mixture is briquetted. It is stated that hereby one avoids both to heat the refuse or waste before the pressing, and to add a bonding agent. It is not clear whether the coal dust acts as a bonding agent, or whether the material in itself has properties such that a bonding agent is not needed.

British patent specification No. 2,112,809A proposes to recover fuel from coal ash by adding water and a binder to said ash, agitating the mixture to allow coarse particles of high coal content to be formed, separating fine particles of high ash content from said coarse particles and dehydrating the coarse particles so as to be able to utilize them as a fuel. The specification does not explain how to use said coarse particles as a fuel but it seems fair to assume that the intention is to use them as such in coal dust fired furnaces.

International Patent Publication WO No. 83/04049 relates to a method of manufacturing combustible pills or briquettes of straw or other combustible material and the method is characterized in that fly ash is used as a binding agent and that the substantially dry material is compacted at a pressure sufficient to generate in the material a temperature of at least 75° C., preferably 100°–200° C. It is stated in a sub-claim that the compaction pressure is preferably 250–2500 kp/cm$^2$ of the material, and according to another sub-claim there is preferably used a fly ash which is "rich in residual carbon", such fly ash being employed in an amount above 10%.

It is not defined more fully what is meant with the expression "rich in residual carbon" but in the specification it is mentioned that good (attractive) fuel briquettes may be prepared by compaction of pure fly ash of a type holding some 80–85% of coal (carbon). Elsewhere in the specification it is said that there are some types of fly ash with up to 80–90% carbon. This piece of information is hardly correct, or is only correct in so far as exceptional cases are concerned. According to type of fuel (oil, coal, lignite) and type of combustion plant the content of carbon in fly ash varies from about 10% to about 50%, in rare cases perhaps up to around 70%.

It seems to appear from the WO publication that the higher the content of carbon in the fly ash, the higher the content thereof in the fuel briquettes must be. This firstly appears from the requirement as to an amount of at least 10% fly ash as bonding agent when it is a high percentage fly ash, and secondly from the statement that a fly ash containing only 10% carbon is perfectly usable in straw briquettes when the latter contain only 5% fly ash. From this one can deduce that it is the ash components of the fly ash that act as a binding agent, both in straw briquettes and in "pure" fly ash briquettes.

It has been found, however, that there is a definite disadvantage in using fly ash as a binder in biomass and industrial waste briquettes. This disadvantage is that the ash components of the fly ash cause a strong wear on the presses used for the manufacture of the briquettes. It is fair to assume that this wear is the less the more carbon there is in the fly ash, but since the amount of carbon therein as mentioned very seldom and exceptionwise is above 50%, and since for obvious reasons one makes heavy efforts to conduct the combustion of the fuel, notably in larger plants such as power stations and big district heating stations, in a manner so as to minimize the carbon content of the fly ash, the availability of such fly ash types having a very high content of carbon may be expected to decrease rather than increase.

Fly ash consists of discrete particles having very variable particle size, in fly ash from coal dust fired plants mainly of 3–300 μm, from roast furnace plants (stoker plants) of 5–500 μm. The particles are of two types, ash particles which are substantially spherical, frequently hollow, and consist quite predominantly of mineral material; and carbon particles which have irregular shape and mainly consist of carbon. However, mixed particles may occur wherein mineral material and carbon are present in more uniform amounts.

It is known that by flotation one can separate the fly ash into two fractions of which one quite predominantly contains mineral components and the other predominantly coal (carbon). Such a separation process which is particularly advantageous is described in U.S. Pat. No. 4,426,282 and its counterparts in other countries such as GB No. 2,092,918 or DE No. 3,205,385. It consists in floating fly ash in at least two steps, pH being adjusted in the first step at 6–8 and in the second step at at least one pH unit lower, preferably at pH 3–5. By optimizing the process parameters (collector, frother, temperature, aeration, time for adding chemicals) it is possible to obtain a carbon fraction. In the present specification with appended claims this carbon-rich fraction is called fly ash coke and it has a content of up to 85% or 90% of carbon or even more.

Fly ash coke cannot be named fly ash. For, it is found that the abovementioned mineral particles are absent or only present in a small amount, at most 5% by weight and normally considerably less. Mineral material accordingly is substantially only present as impurities in the irregularly shaped coke particles (coal particles, carbon particles). The amount thereof first and foremost depends upon the source of the fly ash, i.e. the quality of the fuel the combustion of which has caused the fly ash formation. In exceptional cases mineral impurities in the individual coke particles may constitute up to about 30% but normally they will only constitute from 5% or less up to about 20%.

Despite the irregular shape the coke particles do not cause nearly so much wear on the parts of the briquette presses with which they come into contact as the mineral particles sorted out by the flotation, the hardness of which is considerably higher than that of the coke particles.

Notwithstanding the intimations in the abovementioned international publication WO No 83/04049 that the binding effect mostly resides with the mineral components of the fly ash, the fly ash coke exhibit satisfactory binding effect even when only employed in small amounts in the briquettes. The binding effect possibly is connected with the fact that by microscopical investigations it has been found that a small amount of graphite is condensed on the surface of the coke particles.

BRIEF DESCRIPTION OF THE INVENTION

For the reasons given above, it has been found that excellent briquettes based on solid combustible organic material such as biomass material and industrial waste, and containing a solid combustible binder originating from fly ash are obtained when the binder is fly ash coke in an amount of 3–50% of the weight of the briquettes. Apart from acting as a binder, the fly ash coke in the majority of cases will also increase the calorific value of the briquettes in comparison with the calorific value of the biomass or industrial waste material.

An advantage in using fly ash coke rather than fly ash also is that one avoids recovering the mineral fraction, separated off by the flotation of the fly ash, in the new fly ash possibly formed by the combustion of the briquettes and thereby contributes to decrease the charging on flue gas filters and/or air pollution of the surroundings of the combustion site in question.

Briquettes having such low a content of fly ash coke as 3–5% crumble rather easily by taking up moisture and therefore are not suitable for storing for long periods, particularly not outdoors. According to the invention briquettes having a content of 15–20% by weight, somewhat depending on the nature of the biomass or industrial waste material forming the basis of the briquettes, are very advantageous. In some cases, however, a content of 30–40% by weight of fly ash coke in the briquettes may be preferred because thereby there is obtained briquettes having a good strength so that they can be stored outdoors, and very good calorific value.

DESCRIPTION OF VARIOUS EMBODIMENTS OF THE INVENTION

The invention also relates to a method of preparing the fuel briquettes described. In this method a solid organic combustible material such as a biomass material and/or combustible industrial waste is admixed—if necessary or desired after a comminuting into particles of a suitable size as is wellknown for those skilled in the art of preparing fuel briquettes—with a binder originating from fly ash and is thereupon pressed to form briquettes under pressure and elevated temperature in a briquette press in a manner known per se to anybody versed in the art of manufacturing fuel briquettes. According to the invention, this method is characterized in using fly ash coke—as hereinbefore defined—as the binder in an amount of 3–50%, calculated on the weight of the finished briquettes.

As mentioned hereinbefore it is preferred to use the fly ash coke in an amount of 15–20% b.w. of the weight of the finished briquettes; though in some cases a content of fly ash coke in the finished briquettes as high as 30–40% b.w. may be advantageous.

It has been found when operating the invention that the elevated temperature needed for making the briquettes in the briquette press in principle may be achieved simply by the influence of the pressure used in the press. According to the invention it has been found that a pressure of 70–110 kg/cm$^2$, preferably about 90 kg/cm$^2$, measured as the nozzle pressure at which the briquetting material—i.e. organic material plus fly ash coke—is extruded, with only a modest preheating will frequently result in a suitable temperature during the extrusion, though of course to some degree depending upon the outer temperature. Thus, when the outer temperature is not too low, in many cases the extrusion pressure without or by a moderate preheating will give a suitable temperature, i.e. some 70°–85° or 90° C. of the briquettes while being shaped and pressed in the briquette press. However, it has been found that the specific energy consumption for making the briquettes decreases very much (as will be shown in the Example hereinbelow) if according to the invention the mixture of combustible organic material and fly ash coke is preheated to a temperature of 50°–70° C. before being conveyed to the briquette press.

EXAMPLE

Briquette pellets were made in a briquette press from straw and fly ash coke. The fly ash coke had been prepared according to the teachings of U.S. Pat. No. 4,426,282 and had a moisture content of 39.2% by weight.

The straw was coarsely cut up and ground over a riddle having openings of diameter 8 mm. Its moisture content was 10.5% by weight. The moisture content was supplemented at the feeding to the briquette press to a level as shown in the table below.

All of the runs were made on new (unworn) dies and press rollers. The pellets prepared all had a diameter of 8 mm and a height of 55 mm, except in runs Nos. 10 and 11, where the height of the pellets was 65 mm.

The results are shown in the table which states the percentage of fly ash coke in the mixture briquetted (pelleted), the amount of straw and fly ash coke contained in the mixture fed to the briquette press; the total moisture content in that mixture as fed to the press; the temperature of the raw material when fed to the press; the specific energy consumed in the press during the briquetting operation (in kWh per metric ton); the temperature of the briquettes when leaving the press; and the bulk weight of the finished briquettes.

Accordingly, steam addition and consequent temperature increase of the raw materials must be considered advantageous at a 15% b.w. content of fly ash coke even though it is not advantageous at the 5% level. The steam addition, however, has a homogenizing or "equalizing" effect.

The briquettes of runs Nos. 1, 10 and 11 (bulk weights 700–730 kg/m$^3$) were considered to be unnecessarily hard, resulting in an unnecessarily high wear on the dies etc. of the briquette press. The briquettes resulting from run Nos. 2, 4, 5 and 6 are considered ideal; they do not cause undue high wear on the briquette press and they have sufficient mechanical strength to not crumble during storage and transport, even under humid conditions.

In other experiments it has been shown that the use of fly ash (in contradistinction to fly ash coke) result in a highly increased load and wear on the press. The energy consumption at a fly ash level of 4% is about 50% higher than when using fly ash coke.

Pelleting of Straw by the Aid of Fly Ash Coke as Binder

| Run No. | Approximate % b.w. of fly ash coke | Fly ash coke, kg/h | Straw kg/h | Total raw material weight kg/h | Moisture in raw material, % b.w. | Temperature of raw material, °C. | Specific energy consumption, kWh/ton | Pellet temperature, °C. | Bulk weight of pellets, kg/m$^3$ | |
|---|---|---|---|---|---|---|---|---|---|---|
| 1 | 5 | 11 | 190 | 201 | 13 | 32 | 23 | 84 | 700 | |
| 2 | 5 | 11 | 190 | 201 | 14.5 | 51 | 12 | 76 | 640 | |
| 3 | 5 | 11 | 190 | 201 | 16 | 70 | 8 | 78 | 492 | |
| 4 | 15 | 35 | 190 | 225 | 15 | 32 | 14 | 80 | 640 | |
| 5 | 15 | 35 | 190 | 225 | 16.5 | 53 | 9 | 74 | 520 | |
| 6 | 15 | 35 | 190 | 225 | 18 | 72 | 7 | 80 | 575 | |
| 7 | 30 | 85 | 190 | 275 | 19.5 | 32 | 10 | 70 | 320 | crumbling |
| 8 | 30 | 85 | 190 | 275 | 21 | 50 | 17 | 75 | 320 | |
| 9 | 30 | 85 | 190 | 275 | 22.5 | 70 | 8 | 73 | 320 | |
| 10 | 15 | 37 | 190 | 227 | 15 | 15 | 30 | 90 | 700 | |
| 11 | 5 | 11 | 190 | 201 | 12 | 15 | 32 | 95 | 730 | |

The temperature increase of the raw material fed to the briquette press was achieved by the addition of steam.

Runs Nos. 1, 2, 4, 5 and 6 all resulted in a good quality of the briquettes or pellets prepared, i.e. they had a suitable hardness and did not crumble under the influence of a humid atmosphere. The bulk weight of the briquettes of runs Nos. 7 through 9 was too low and caused the briquettes to crumble when stored. This does not mean that briquettes according to the invention are not satisfactory with a content of fly ash coke of 30% b.w., but only that the conditions of preparation were not suitable for this high content of binder. The reason probably is a too high moisture content in the raw materials.

Runs Nos. 2 and 5 and especially Nos. 3 and 6 show that an input temperature of the raw materials of 50°–70° C. greatly reduces the energy consumption in the briquette press; as the temperature increase is caused by the addition of steam, the moisture content is simultaneously increased moderately and it is supposed that a highly contributing cause of the reduction in energy consumption is the increased moisture content. In the case of briquettes having a fly ash coke content of 5% this increased moisture content resulted in a poorer quality of the briquettes (as reflected by the bulk weight) whereas the result of runs Nos. 4–6, at the 15% content of fly ash coke, were that the coke had a satisfactory quality even at the higher preheating temperature and corresponding higher moisture content of the raw material.

I claim:
1. In fuel briquettes made on the basis of solid combustible organic material and containing a solid, combustible binder originating from fly ash, the improvement that the binder is fly ash coke in an amount of 3% to 50% by weight of the briquettes and that the solid combustible organic material excludes anthracite, pit coal and lignite.

2. Fuel briquettes as claimed in claim 1, wherein the fly ash coke is present in an amount of 15% to 20% by weight of the briquettes.

3. In a method for preparing fuel briquettes based on a solid organic combustible material which is admixed with a binder originating from fly ash and is thereupon pressed to form briquettes under pressure and elevated temperature in a briquette press in a manner known per se, the improvement consisting in using fly ash coke as the binder in an amount of 3% to 50%, calculated on the weight of the finished briquettes and in using solid organic combustible material from which anthracite, pit coal and lignite have been excluded.

4. A method as claimed in claim 3, wherein the fly ash coke is used in an amount of 15–20% calculated on the weight of the finished briquettes.

5. A method as claimed in claim 3, wherein the briquettes are pressed in the briquette press at a pressure of 70–100 kg/cm$^2$ nozzle pressure.

6. A method as claimed in claim 4, wherein the briquettes are pressed in the briquette press at a pressure of 70–100 kg/cm$^2$ nozzle pressure.

7. A method as claimed in claim 5, wherein the briquettes are pressed in the briquette press at a pressure of about 90 kg/cm².

8. A method as claimed in claim 6, wherein the briquettes are pressed in the briquette press at a pressure of about 90 kg/cm².

9. A method as claimed in claim 5, 6, 7, or 8, wherein the mixture of solid combustible material and fly ash coke is pre-heated to a temperature of 50–70 degrees C. before it is conveyed to the briquette press.

* * * * *